Nov. 1, 1966 A. F. SCARPELLI 3,283,116
ELECTRICAL DISCHARGE MACHINING METHOD AND APPARATUS
Filed May 4, 1962

INVENTOR.
August F. Scarpelli
BY
Hugh L. Fisher
ATTORNEY

United States Patent Office 3,283,116
Patented Nov. 1, 1966

3,283,116
ELECTRICAL DISCHARGE MACHINING METHOD AND APPARATUS
August F. Scarpelli, Warren, Mich., assignor to General Motors Corporation, Detroit, Mich., a corporation of Delaware
Filed May 4, 1962, Ser. No. 192,472
14 Claims. (Cl. 219—69)

This invention relates to improvements in methods and apparatus for electrical stock removal.

In one process of electrical stock removal known as Electrical Discharge Machining, conductive cutting tool and workpiece electrodes are spaced apart to form a dielectric filled machining gap therebetween. Voltage is applied intermittently across the gap and causes stock to be eroded from the workpiece electrode according to a pattern determined by the shape of the cutting tool electrode. Because of the inherent nature of the electrical discharge machining process, it is particularly suited for generating irregular contours such as those required in die work. Necessarily, the cutting tool electrodes with these irregular contours are expensive to form so that excessive wear of the cutting tool electrode during the process substantially increases the cost.

Continuous efforts are being made to overcome this problem of wear. These efforts include the minimizing of the inductance in the discharging circuit, which includes the gap, and the prevention of reverse currents. These approaches are based on the theories that the inductance and the reverse currents promote erosion of the cutting tool electrode. Neither of these approaches has been a satisfactory solution to the wear problem.

Accordingly, the invention contemplates novel method and apparatus for electrical stock removal wherein the wear of the cutting tool electrode is substantially reduced. The invention further seeks to provide method and apparatus for increasing cutting tool life by producing a wear-inhibiting hardened layer of material on the exterior of the cutting tool electrode as stock is eroded from the workpiece electrode.

More specifically, it is an aim of the invention to furnish new method and apparatus for controlling the time interval during which the gap between the electrodes is conductive so that current will flow and produce molten particles from the eroded stock in the gap. These molten particles are then caused to be mechanically bonded to the cutting tool electrode surface and protect it against wear.

The foregoing and other objects and advantages of the invention will become apparent from the following description and the accompanying drawings in which.

Figure 1:
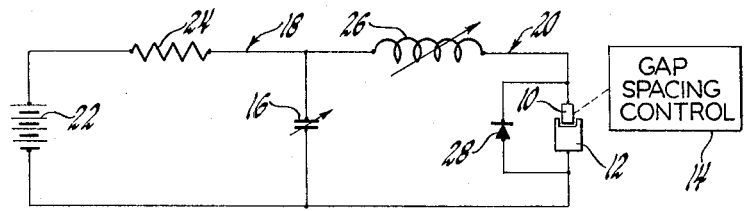
FIGURES 1 and 2 are diagrams of circuits embodying the principles of the invention.

Referring again to FIGURE 1, an RC type power supply is illustrated for applying an intermittent voltage across a gap formed between two conductive electrodes, hereinafter referred to as a cutting tool 10 and a workpiece 12. The gap may be maintained by any known gap spacing control 14, such as that disclosed in the Patent 3,059,150 to Colten et al., issued October 16, 1962, and entitled Electrical Discharge Machining Apparatus. Briefly, in this control, the gap voltage is compared with a reference voltage that corresponds to the desired gap spacing and any differential is employed for operating a motor. The motor maneuvers the cutting tool 10 and the workpiece 12 relative to each other as stock is eroded from the workpiece 12 so as to maintain the desired gap spacing.

The power supply includes an energy storage provision as variable capacitor 16. The capacitor 16 is in parallel with the gap and is common both to a charging circuit 18 and a discharging circuit 20. In the charging circuit 18, a direct current source 22 is in series with the capacitor 16 and charges the capacitor 16 through a current limiting resistor 24. When the charge on the capacitor 16 is sufficient to ionize the gap, a breakdown occurs and discharge current flows from the capacitor 16 through a variable inductor 26 and across the gap between the cutting tool 10 and the workpiece 12. A unidirectional conducting device, in this embodiment a rectifier 28, is connected across the gap and prevents the flow of reverse currents across the gap by providing a path around the gap. Hence, gap current is always of the same polarity.

During operation, the capacitor 16 will be charged in accordance with the RC time constant and will discharge whenever the voltage is adequate to produce a gap breakdown. The repetition rate of these discharges will, of course, be determined by the RC time constant as well as several other factors, such as the dielectric fluid employed, the gap spacing, the materials of which the cutting tool 10 and the workpiece 12 are made, and the voltage of the source 22.

In the past, and as has been mentioned, it has been customary to minimize the amount of inductance in the discharging circuit 20. It was felt that any inductance tended to continue the current flow across the gap and as a result slow down the process as well as cause excessive wear of the cutting tool 10. In particular, it was thought that the frequency of the gap discharges was reduced because the continued flow of current increased the time required to deionize the gap so that the next discharge could be initiated. Also, it was thought that the continued current flow could prevent a discharge or at least reduce the effectiveness of the discharge.

Figure 3:
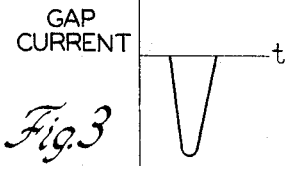
FIGURES 3 and 4 are curves showing the gap current in the FIGURE 1 circuit.
Figure 4:
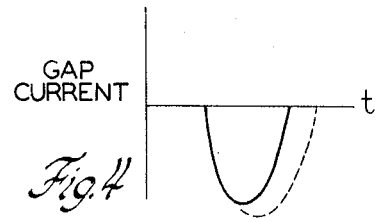
Figure 6:
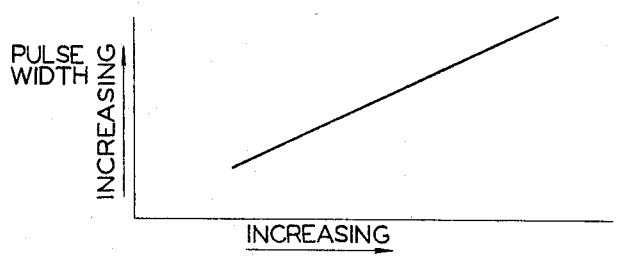
FIGURE 6 is a graph showing the relationship between pulse width and wear ratio for further demonstrating the invention.

Contrary to this theory of minimizing inductance in the discharging circuit 20, it has been discovered that by actually increasing the inductance as by incorporating the variable inductor 26 in the discharging circuit 20, the gap current pulse has a power peak but a greater width. This is demonstrated by comparing the gap current pulses in FIGURES 3 and 4. As can be seen, by increasing the inductance of the discharging circuit 20, the pulse width in FIGURE 3 increases to that shown by the solid line curve in FIGURE 4. The pulse width can be increased even further by also increasing the capacitance of the capacitor 16. The gap current pulse will also have a higher peak due to the increased capacitance and will appear as depicted by the broken line curve in FIGURE 4. These increases in the pulse width increase the wear ratio as shown in the FIGURE 6 graph where the wear ratio is the relationship between the volume of material removed from the workpiece to the volume of material removed from the cutting tool. The FIGURE 6 curve was obtained when using a copper cutting tool to machine a steel workpiece and while keeping the peak gap current constant.

In effect, by using the inductor 26, and increasing the pulse width, it was discovered that the machining time was not substantially altered but that the gap was maintained conductive for a longer interval than that required for the main electrical stock removing discharge. By maintaining the gap alive, current will continue to flow and cause the products of the discharge remaining in the gap and tending to form bridges across the gap to be melted. These melted particles then react with the gas produced by the cracking of the dielectric fluid during the discharge and form a mechanical bond on the exterior surface of the cutting tool 10. This surface on copper, zinc, zinc-tin, and aluminum cutting tools has been found to be very hard and more difficult to hand file than the material of the electrode itself. This hardened layer of material definitely resists wear of the cutting tool thus increasing its life and providing a substantially greater wear ratio. Consequently, cutting tools can be made of the easily cast metals. Otherwise metals with high melting points, such as copper tungsten would have to be used to achieve satisfactory wear ratios. These high melting point metals are difficult to cast and are more expensive.

Figure 2:
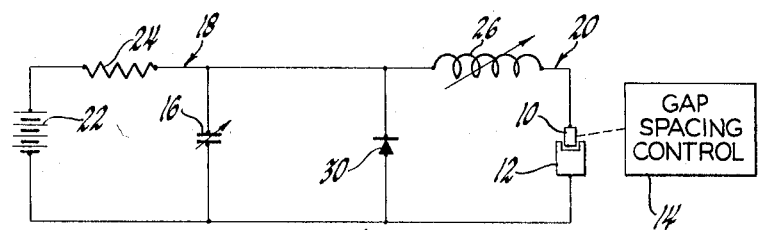
Figure 5:
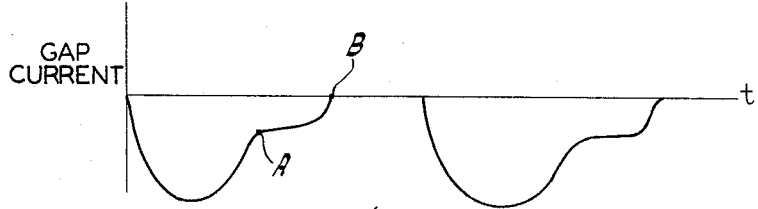
FIGURE 5 is a curve showing the gap current in the FIGURE 2 circuit.

The FIGURE 2 power supply is the same as that shown in FIGURE 1 except that the rectifier 28 has been removed and a unidirectional conducting device as rectifier 30 installed in parallel with the capacitor 16. The purpose of the rectifier 30 is also to maintain the gap alive by extending the intervals during which so-called spill-over current is permitted to flow through the gap. Once an electrical discharge occurs across the gap, the inductor 26 will continue the resultant current flow, and this will be aided by the rectifier 30, for a current path will be provided around the capacitor 16. Hence, current will continue to flow around a path including the inductor 26, the gap between the cutting tool 10 and the workpiece 12, and the rectifier 30. The gap current will appear as shown by the curve in FIGURE 5. The peak will be that at which the capacitor 16 discharges. Thereafter, the gap current will decrease to point A. The time when the spill-over current flows, which is the time interval between points A and B in FIGURE 5, can be varied by the adjustment of either the inductor 26 or the capacitor 16, or both. This actually involves changing the RLC constant of the discharging circuit 20 to increase the discharge time or the interval during which the gap is conductive. Because of the nature of the application of the power supply, the inherent inductance due, e.g., to the load, may be adequate and it may be preferred to use a variable resistance in the discharging circuit 20. This will, of course, be decided by the RLC constant required but it must be kept in mind that both the amount of spill-over current and the time interval during which the gap is maintained alive influence the wear ratio, as does the ratio of peak current to pulse width. In other words, cutting tool wear can be reduced either by increasing the gap current pulse duration, decreasing the ratio of the peak gap current to gap current pulse width, increasing the magnitude of the spill-over current, or a combination of these.

Another factor to be considered is the polarities of the cutting tool 10 and the workpiece 12. It is customary to have the tool 10 negative and the workpiece 12 positive, and of course, tool life can be increased in the foregoing ways with these conventional polarities but it has been found that with the reverse, i.e., with the tool 10 positive and the workpiece 12 negative, even better tool life can be obtained in many applications. It is thought that with these reverse polarities, current electron flow physically carries molten particles to the tool 10 and thereby facilitates the formation of the hardened protective coating on the tool 10. In fact, only when the workpiece is of negative polarity have wear ratios of greater than 30:1 been achieved.

From the foregoing, it will be appreciated that by the invention, the machining gap is maintained alive long enough to promote the formation of a hardened layer of material on the exterior surface of the cutting tool. This hardened layer substantially increases the cutting tool life. This increase in the cutting tool life is particularly desirable when substantial costs are involved in forming the cutting tool because of the material and/or the complexity of the required tool shape.

The invention is to be limited only by the following claims.

I claim:
1. The method of electrical stock removal by a series of time spaced stock removing electrical discharges across an ionizable gap between conductive workpiece and cutting tool electrodes comprising the steps of applying an intermittent voltage across the gap for producing a discharge current and accordingly the electrical stock removing discharges and flowing current of the same polarity as the discharge current and of a lower voltage than the intermittent voltage through the gap between discharges so as to cause a hardened layer of material to be formed on the cutting tool electrode from the eroded stock for reducing the wear of the cutting tool electrode.

2. In the method of electrical stock removal, the steps of applying intermittent power across an ionizable fluid filled gap formed between cutting tool and workpiece electrodes so as to produce electrical discharges across the gap for eroding stock from the workpiece electrode and supplying current of the same polarity as and at lower voltage than the discharge voltage to the gap between the discharges and while the gap is conductive so as to cause a hardened layer of material to be formed on the cutting tool electrode surface from the eroded stock for reducing the wear of the cutting tool electrode.

3. In the method of electrical stock removal, the steps comprising applying an intermittent voltage across a carbonaceous dielectric filled gap formed between cutting tool and workpiece electrodes so as to produce electrical discharges across the gap for eroding stock from the workpiece electrode and controlling the discharge current so as to be of the same polarity as the intermittently applied voltage and of a reduced magnitude for causing a carbide layer of material to adhere to the surface of the cutting tool electrode and thereby increase the volumetric wear ratio of the cutting tool electrode.

4. The method of electrical stock removal by a series of time spaced stock removing electrical discharges across a dielectric fluid filled gap between conductive workpiece and cutting tool electrodes comprising the steps of applying a certain polarity intermittent voltage across the gap formed between cutting tool and workpiece electrodes for producing a certain magnitude discharge current and accordingly the electrical stock removing discharges for eroding stock from the workpiece electrode, and controlling the discharge current produced by the discharge voltage so as to be of the same polarity and of a lesser magnitude than the certain magnitude and thereby produce from the eroded stock, molten particles that react with the gas produced by the cracking of the dielectric fluid and then form a mechanical bond on the surface of the cutting tool electrode for promoting increased cutting tool electrode life.

5. The method of electrical stock removal by a series of time spaced stock removing electrical discharges across a dielectric fluid filled gap between conductive workpiece and cutting tool electrodes comprising the steps of applying an intermittent voltage across the gap for producing the electrical stock removing discharges and supplying a relatively low voltage current of the same polarity as the intermittent voltage to the gap during the time interval when the gap is conductive so as to produce from the eroded stock, molten particles which adhere to the cutting tool electrode thereby increasing the life of the cutting tool electrode.

6. The method of electrical stock removal by a series of time spaced electrical stock-removing discharges across a dielectric fluid filled gap between conductive workpiece and cutting tool electrodes comprising the steps of applying an intermittent relatively high voltage across the gap for producing the electrical stock removing discharges, and circulating a relatively low voltage current of same polarity as the intermittent voltage through the gap between the electrical stock removing discharges so as to produce from the eroded stock, molten particles which are then caused to adhere to the cutting tool electrode surface thereby reducing the wear of the cutting tool electrode.

7. The method of electrical stock removal by a series of time spaced electrical stock removing discharges across a dielectric fluid filled gap between conductive workpiece and cutting tool electrodes comprising the steps of applying an intermittent relatively high voltage across the gap for producing the electrical stock removing discharges, passing the electrical discharge current through an energy storing impedance arranged in series with the gap, and controlling the impedance so as to maintain the gap conductive for a predetermined interval that is greater than required for an electrical stock removing discharge and that is adequate to allow the energy storing impedance to supply the stored energy to the gap so as to continue current flow between the discharges at a relatively low voltage thereby causing particles within the gap to melt and adhere to the cutting tool electrode surface thereby protecting the cutting tool electrode against wear.

8. The method of electrical stock removal by a series of time spaced electrical stock removing discharges across a dielectric fluid filled gap between conductive workpiece and cutting tool electrodes comprising the steps of applying an intermittent relatively high voltage across the gap for producing the electrical stock removing discharges, passing the electrical discharge current through an energy storing inductance arranged in series with the gap, and controlling the inductance so as to maintain the gap conductive for a predetermined interval that is greater than required for an electrical stock removing discharge and that is adequate to allow the inductance to supply the stored energy to the gap so as to continue current flow between the discharges at a relatively low voltage thereby causing particles within the gap to melt and adhere to the cutting tool electrode surface thereby inhibiting cutting tool electrode wear.

9. The method of electrical stock removal by a series of time spaced electrical stock removing discharges across a dielectric fluid filled gap between conductive workpiece and cutting tool electrodes comprising the steps of applying an intermittent relatively high voltage across the gap with cutting tool electrode positive and the workpiece electrode negative so as to produce the electrical stock removing discharges, and passing the electrical discharge current through an energy storing impedance arranged in series with the gap so as to maintain the gap conductive for a predetermined interval that is greater than required for an electrical stock removing discharge and that is adequate to continue current flow between the discharges at a relatively low voltage for causing particles within the gap to melt and adhere to the cutting tool electrode surface thereby inhibiting cutting tool electrode wear.

10. In electrical stock removal apparatus, conductive tool and workpiece electrodes spaced apart so as to form a dielectric fluid filled gap therebetween, a source of electrical energy, and impedance means, both the source and the impedance means being arranged in series with the gap, the impedance means having a certain value adequate to maintain the gap conductive for a time interval greater than that required for an electrical stock removing discharge so as to cause current flow between the discharges thereby causing particles within the gap to be melted and to adhere to the surface of the cutting tool electrode so that the wear of the cutting tool electrode is reduced.

11. In electrical stock removal apparatus, the combination of conductive tool and workpiece electrodes spaced apart so as to form a dielectric fluid filled gap therebetween; storage means for storing a predetermined quantity of electrical energy; a charging circuit including the storage means and a source of current for charging the storage means; and a discharging circuit including the storage means, and inductive means in series with both the storage means and the gap, the discharging circuit being operative to discharge the storage means upon breakdown of the gap and cause an electrical stock removing discharge across the gap; the inductive means having a certain value for maintaining the gap conductive for a time interval greater than required for an electrical stock removing discharge thereby continuing current flow between the discharges so as to produce molten particles from the gap products and cause the molten particles to adhere to the surface of the cutting tool electrode thus protecting the cutting tool electrode against wear.

12. In electrical stock removal apparatus; conductive cutting tool and workpiece electrodes spaced apart so as to form a dielectric fluid filled gap therebetween; storage means for storing a predetermined quantity of electrical energy; a charging circuit including the storage means, a source of current for charging the storage means, and current limiting resistive means in series with the source and the storage means; and a discharging circuit including the storage means, inductive means, the storage means and the inductive means both being in series with the gap, and a unidirectional conducting device in parallel with the storage means for by-passing the storage means; the discharging circuit causing a breakdown of the gap so as to produce an electrical stock removing discharge across the gap; the inductive means having a certain value for maintaining the gap conductive for a predetermined time interval greater than required for an electrical stock removing discharge so that current flow in the discharging circuit is through the unidirectional conducting device and the inductive means and the gap, the predetermined time interval also being adequate to produce molten particles which are caused to adhere to the exterior of the cutting tool electrode and form a hardened shell for protecting the cutting tool electrode against wear.

13. In electrical stock removal apparatus; conductive cutting tool and workpiece electrodes spaced apart so as to form a dielectric fluid filled gap therebetween; storage means for storing a predetermined quantity of electrical energy; a charging circuit including the storage means, a source of current for charging the storage means, and current limiting resistive means in series with the source and the storage means; and a discharging circuit including the storage means, inductive means, the storage means and the inductive means both being in series with the gap, and a unidirectional conducting device connected across the gap and arranged so as to block reverse current flow across the gap; the discharging circuit causing a breakdown of the gap so as to produce an electrical stock removing discharge across the gap; the inductive means having a certain value for maintaining the gap conductive for a predetermined time interval greater than that required for an electrical stock removing discharge so that current flow in the discharging circuit is through the unidirectional conducting device and the inductive means and the gap, the predetermined time interval also being adequate to produce molten particles which are caused to adhere to the exterior of the cutting tool electrode and form a hardened shell for protecting the cutting tool electrode against wear.

14. The method comprising the steps of applying intermittent electrical power across a contaminated dielectric fluid filled gap formed between a pair of electrodes so as to produce a discharge current in a certain direction and accordingly electrical discharges across the gap and maintaining the gap conductive between each discharge and continuing current flow therethrough in the same certain direction and at lower voltage so as to cause a hardened layer of material to be formed on the surface of one of the electrodes for wear inhibiting purposes.

References Cited by the Examiner
UNITED STATES PATENTS

| | | | |
|---|---|---|---|
| 2,756,316 | 7/1956 | Teubner | 219—69 |
| 2,815,435 | 12/1957 | Adcock | 219—69 |

(Other references on following page)

UNITED STATES PATENTS

| | | | |
|---|---|---|---|
| 2,835,784 | 5/1958 | Williams | 219—69 |
| 2,845,520 | 7/1958 | Bruma | 315—227.1 |
| 2,967,226 | 1/1961 | De Bruijn | 219—69 |
| 3,033,971 | 5/1962 | Pfau | 219—69 |
| 3,035,149 | 5/1962 | Matulaitis | 219—69 |
| 3,052,817 | 9/1962 | Branker | 219—69 X |
| 3,062,985 | 11/1962 | Webb | 219—69 X |
| 3,068,352 | 12/1962 | Correy | 219—137 |
| 3,098,149 | 7/1963 | Inoue | 315—245 |

OTHER REFERENCES

"Mechanical Engineering—Section C" Nat'l Science Foundation, Washington, D.C. English translation (1961) of U.S.S.R. Academy of Sciences volume, published 1958, pp. 103–106.

RICHARD M. WOOD, *Primary Examiner*.

ARTHUR GAUSS, *Examiner*.

A. M. LESNIAK, R. F. STAUBLY, *Assistant Examiners*.